United States Patent
Kawahara et al.

(10) Patent No.: US 12,463,724 B2
(45) Date of Patent: Nov. 4, 2025

(54) MULTIPATH INTERFERENCE ANALYSIS DEVICE AND MULTIPATH INTERFERENCE ANALYSIS METHOD

(71) Applicant: NTT, Inc., Tokyo (JP)

(72) Inventors: Hiroki Kawahara, Musashino (JP); Takeshi Seki, Musashino (JP)

(73) Assignee: NTT, Inc., Tokyo (JP)

( * ) Notice: Subject to any disclaimer, the term of this patent is extended or adjusted under 35 U.S.C. 154(b) by 253 days.

(21) Appl. No.: 18/556,434

(22) PCT Filed: Apr. 27, 2021

(86) PCT No.: PCT/JP2021/016829
§ 371 (c)(1),
(2) Date: Oct. 20, 2023

(87) PCT Pub. No.: WO2022/230061
PCT Pub. Date: Nov. 3, 2022

(65) Prior Publication Data
US 2024/0204873 A1 Jun. 20, 2024

(51) Int. Cl.
*H04B 10/07* (2013.01)
*H04B 10/2581* (2013.01)
(Continued)

(52) U.S. Cl.
CPC ....... *H04B 10/2581* (2013.01); *H04B 10/697* (2013.01); *G02B 6/0288* (2013.01);
(Continued)

(58) Field of Classification Search
CPC .. H04B 10/2581; H04B 10/697; H04B 10/07; H04B 10/25; H04B 10/2507; G02B 6/0288
(Continued)

(56) References Cited

U.S. PATENT DOCUMENTS 5,999,258 A * 12/1999 Roberts ............ H04B 10/07951
356/519
6,317,214 B1 * 11/2001 Beckett ................ G01M 11/331
356/73.1
(Continued)

OTHER PUBLICATIONS

Mahajan et al, Accurate Analytical Model for Calculation of Multipath Interference in Bend-insensitive Fibers, Jul. 2018, Advanced Photonics, All Document. (Year: 2018).*
(Continued)

*Primary Examiner* — Dibson J Sanchez
(74) *Attorney, Agent, or Firm* — Fish & Richardson P.C.

(57) ABSTRACT

A multipath interference analysis device includes a statistical amount calculation unit that calculates statistical amounts of respective measurement values of splice loss measured from a plurality of optical fiber pieces for forming an optical transmission line, and measurement values of cutoff wavelength, a determination unit that determines a truncated normal distribution from a normal distribution of the cutoff wavelength, a random number generation unit that generates random numbers for selecting a predetermined number of pieces of splice connection targets of the optical transmission line, and an MPI value calculation unit that calculates an MPI value using a mode dependent loss of a fundamental mode of the optical transmission line formed of each piece selected according to the random numbers, and a splice interval.

5 Claims, 8 Drawing Sheets

(51) Int. Cl.
  *H04B 10/69* (2013.01)
  *G02B 6/028* (2006.01)
  *H04B 10/25* (2013.01)
  *H04B 10/2507* (2013.01)

(52) U.S. Cl.
  CPC .............. *H04B 10/07* (2013.01); *H04B 10/25* (2013.01); *H04B 10/2507* (2013.01)

(58) Field of Classification Search
  USPC ........................ 398/9–38, 140–172, 202–214
  See application file for complete search history.

(56) References Cited

U.S. PATENT DOCUMENTS

| | | | | |
|---|---|---|---|---|
| 6,477,297 | B1* | 11/2002 | DeMeritt | H01S 3/06708 385/32 |
| 7,415,206 | B1* | 8/2008 | Birk | H04B 10/071 398/21 |
| 2003/0169427 | A1* | 9/2003 | Muro | H04B 10/503 356/450 |
| 2003/0235360 | A1* | 12/2003 | Mozdy | G02B 6/0228 385/15 |
| 2007/0165978 | A1* | 7/2007 | Chen | G01M 11/3181 356/73.1 |
| 2009/0185171 | A1* | 7/2009 | Kristensen | G01M 11/335 356/73.1 |
| 2011/0075129 | A1* | 3/2011 | Chen | G01M 11/331 356/73.1 |
| 2011/0176767 | A1* | 7/2011 | Tanaka | G02B 6/262 385/27 |
| 2013/0071115 | A1* | 3/2013 | Bennett | H04B 10/2581 385/124 |
| 2013/0094819 | A1* | 4/2013 | Konishi | G02B 6/0285 385/95 |
| 2013/0259426 | A1* | 10/2013 | Li | G02B 6/02038 385/123 |
| 2014/0098361 | A1* | 4/2014 | Fini | G01M 11/333 356/73.1 |
| 2014/0111794 | A1* | 4/2014 | Yablon | G01M 11/338 356/73.1 |
| 2014/0308046 | A1* | 10/2014 | Bliss | H04B 10/2507 398/147 |
| 2016/0154175 | A1* | 6/2016 | Downie | G02B 6/02019 398/144 |
| 2017/0230119 | A1* | 8/2017 | Smith | H04B 10/25073 |
| 2018/0100782 | A1* | 4/2018 | Hayashi | G01M 11/33 |
| 2020/0067595 | A1* | 2/2020 | Huang | H04B 10/071 |
| 2023/0188220 | A1* | 6/2023 | Wen | H04B 10/524 398/208 |

OTHER PUBLICATIONS

Downie et al, Measurements and modeling of multipath interference at wavelengths below cable cutoff, Apr. 2017, Optics Express, All Document. (Year: 2017).*
Aida et al, Statistical Estimation of Multi-Path Interference in Short Bend-Insensitive Fiber, May 2012, Cleo, All Document. (Year: 2012).*
Boivin et al, Recent Developments in Bend-Insensitive and Ultra-Bend-Insensitive Fibers, Feb. 2010, SPIE, All Document. (Year: 2010).*
Li et al, Statistical Analysis of MPI in Bend-insensitive Fibers, Mar. 2009, OSA/OFC/NFOEC, All Document. (Year: 2009).*
Sui et al., "Long-haul quasi-single-mode transmissions using few-mode fiber in presence of multi-path interference," Optics Express, Feb. 2015, 23(3):3156-3169.

* cited by examiner

MULTIPATH INTERFERENCE ANALYSIS DEVICE AND MULTIPATH INTERFERENCE ANALYSIS METHOD

CROSS-REFERENCE TO RELATED APPLICATIONS

This application is a National Stage application under 35 U.S.C. § 371 of International Application No. PCT/JP2021/016829, having an International Filing Date of Apr. 27, 2021, the disclosure of which is considered part of the disclosure of this application, and is incorporated by reference in its entirety into this application.

TECHNICAL FIELD

The present invention relates to a multipath interference analysis device and a multipath interference analysis method for analyzing multipath interference occurring in an optical transmission line.

BACKGROUND ART

In recent years, plans have been underway to introduce an ITU-T G.654.E-compliant optical fiber, which is capable of improving optical signal transmission performance, for a commercial terrestrial network. This optical fiber is characterized in that the optical fiber has a core region, through which an optical signal is transmitted, expanded to reduce an influence of fiber nonlinearity, while a cutoff wavelength, which is a wavelength at a boundary between a single mode and a multimode, is shifted to a longer wavelength. A maximum (longest) cutoff wavelength is 1530 nm.

However, when the cutoff wavelength shifts to a longer wavelength (for example, shifts to more than 1400 nm), a band on the optical fiber with a shorter wavelength than a C band with a wavelength of 1530 nm to 1565 nm (for example, an S band with a wavelength of 1460 nm to 1530 nm) is used.

Because the C band or an L band on the longer wavelength side has a longer wavelength than the above 1530 nm, there is no problem. However, when an S band on the shorter wavelength side than the C band is used, a transmission wavelength becomes equal to or shorter than the cutoff wavelength, and therefore there is concern that the optical signal transmission performance will deteriorate.

Further, a high-order mode with a large loss of optical power may be excited (input) to a fundamental mode (single mode) with excellent transmission loss characteristics and transmission band characteristics due to the shift. When this excitation occurs, multipath interference (MPI) in which the high-order mode interferes with the fundamental mode occurs, adversely affecting optical signal transmission. A major cause of the multipath interference is known to be mode coupling in which optical powers of the high-order mode and the fundamental mode are mutually coupled at a spliced point (fused point) between optical fibers. When the mode coupling occurs, transmission quality deteriorates.

As a method for analyzing the multipath interference, a simple method using as parameters splice loss and mode dependent loss, which are described below, is known. The splice loss is a loss in which transmission loss or reflection occurs when there is a misalignment at a fused point of an optical fiber core, and as the core is larger, a shape is more easily distorted and a misalignment more easily occurs at a fused point. The mode dependent loss (differential mode loss: MDL) is a loss in which a loss value changes when the fundamental mode and the high-order mode pass through an optical fiber. An example of this kind of multipath interference analysis method includes a technique described in NPL 1, for example.

CITATION LIST

Non Patent Literature

[NPL 1] Sui Q, et al., "Long-haul quasi-single-mode transmissions using few-mode fiber in presence of multipath interference", [online], 2015, [searched on Apr. 9, 2020], Internet <URL: https://www.ncbi.nlm.nih.gov/stat>

SUMMARY OF INVENTION

Technical Problem

However, in the multipath interference analysis method described above, the splice loss or the cutoff wavelength actually has a variation, and as a result, the MDL has a variation, making the analysis difficult. The splice loss is caused by axial misalignment, angular misalignment, a gap in a longitudinal direction, and the like at the time of optical fiber connection, and for example, when 100 optical fibers are fused, the splice losses are respectively different at all fused points. This makes analysis difficult. The cutoff wavelength varies in manufacture from one optical fiber piece to another, and for example, when optical fibers randomly selected from among optical fibers manufactured in different production lots are fused, the cutoff wavelength changes in any section between fused points. As a result, the MDL also varies, making analysis difficult.

Therefore, the multipath interference is estimated by assuming practical optical transmission path conditions. However, when equipment for the optical transmission line is configured under the estimated conditions, a problem may occur in optical transmission. Therefore, in a multipath interference analysis method of the related art, there is no choice but to estimate an excessive multipath interference and rely on worst value analysis for achieving certainty of optical transmission. However, in overestimation according to the worst value analysis, an excessively installed optical transmission line is created, resulting in unnecessary costs.

The present invention is made in view of such circumstances, and an object of the present invention is to analyze multipath interference so that wasteful costs arising in optical transmission line equipment constructed under estimation conditions can be suppressed, when multipath interference of an optical transmission line is estimated.

Solution to Problem

In order to solve the above problem, a multipath interference analysis device of the present invention includes a statistical amount calculation unit configured to obtain a normal distribution of a cutoff wavelength through calculation of statistical amounts of average values and variance values of respective measurement values of a splice loss and the cutoff wavelength measured from a plurality of optical fiber pieces each having a predetermined length for forming an optical transmission line; a determination unit configured to truncate the normal distribution of the cutoff wavelength at predetermined lower and upper limit values of the cutoff wavelength to determine a truncated normal distribution; a random number generation unit configured to generate random numbers for selecting a predetermined number of optical fiber pieces of splice connection targets forming the optical transmission line on a basis of the determined truncated normal distribution; and an MPI value calculation unit configured to calculate an MPI value in the optical transmission line formed of the predetermined number of optical fiber pieces selected according to the random numbers using a mode dependent loss in a fundamental mode and a splice interval of the optical transmission line, the MPI value being a value of multipath interference caused by the cutoff wavelength and the splice loss.

Advantageous Effects of Invention

According to the present invention, when the multipath interference of an optical transmission line is estimated, it is possible to analyze the multipath interference to suppress wasteful costs arising in the optical transmission line equipment constructed under the estimation conditions.

DESCRIPTION OF EMBODIMENTS

Hereinbelow, embodiments of the present invention is described with reference to the drawings. However, in all the drawings of this specification, components having corresponding functions are denoted by the same reference numerals, and descriptions thereof are omitted as appropriate.

<Configuration of Embodiment>

Figure 1:
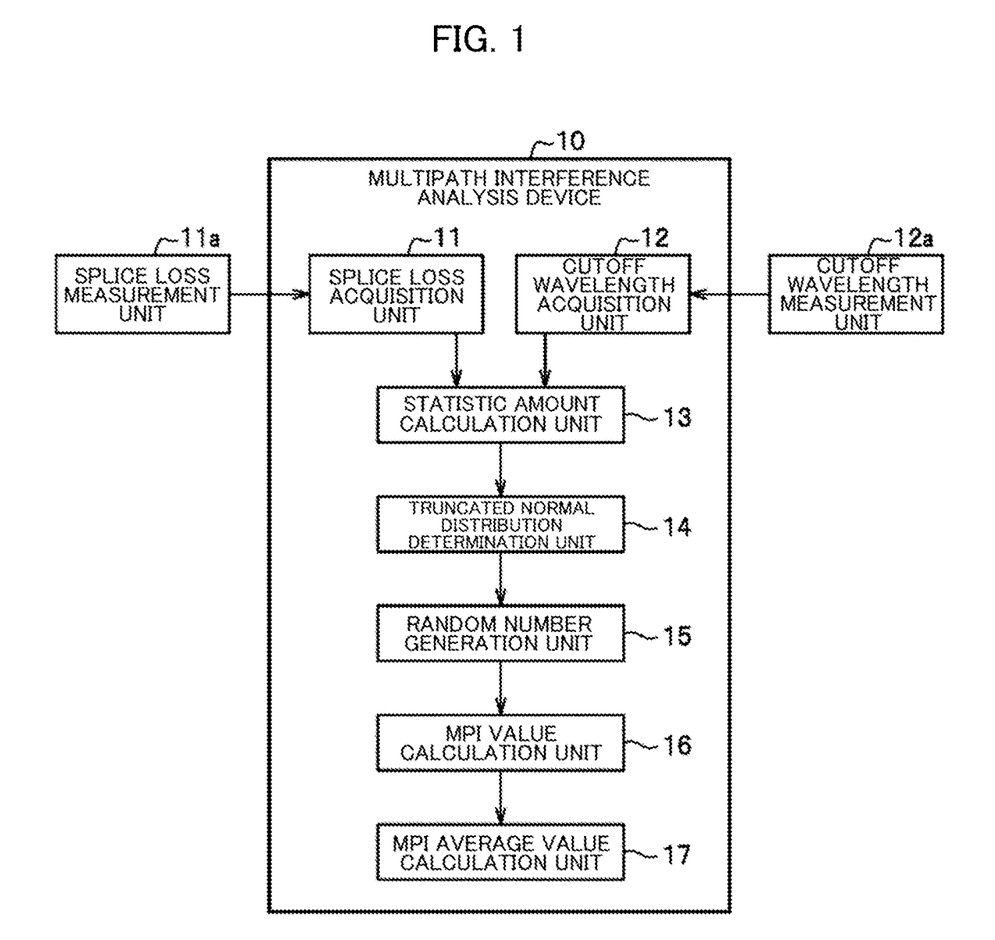
FIG. 1 is a block diagram illustrating a configuration of a multipath interference analysis device according to an embodiment of the present invention.

FIG. 1 is a block diagram illustrating a configuration of a multipath interference analysis device according to an embodiment of the present invention.

Figure 2:
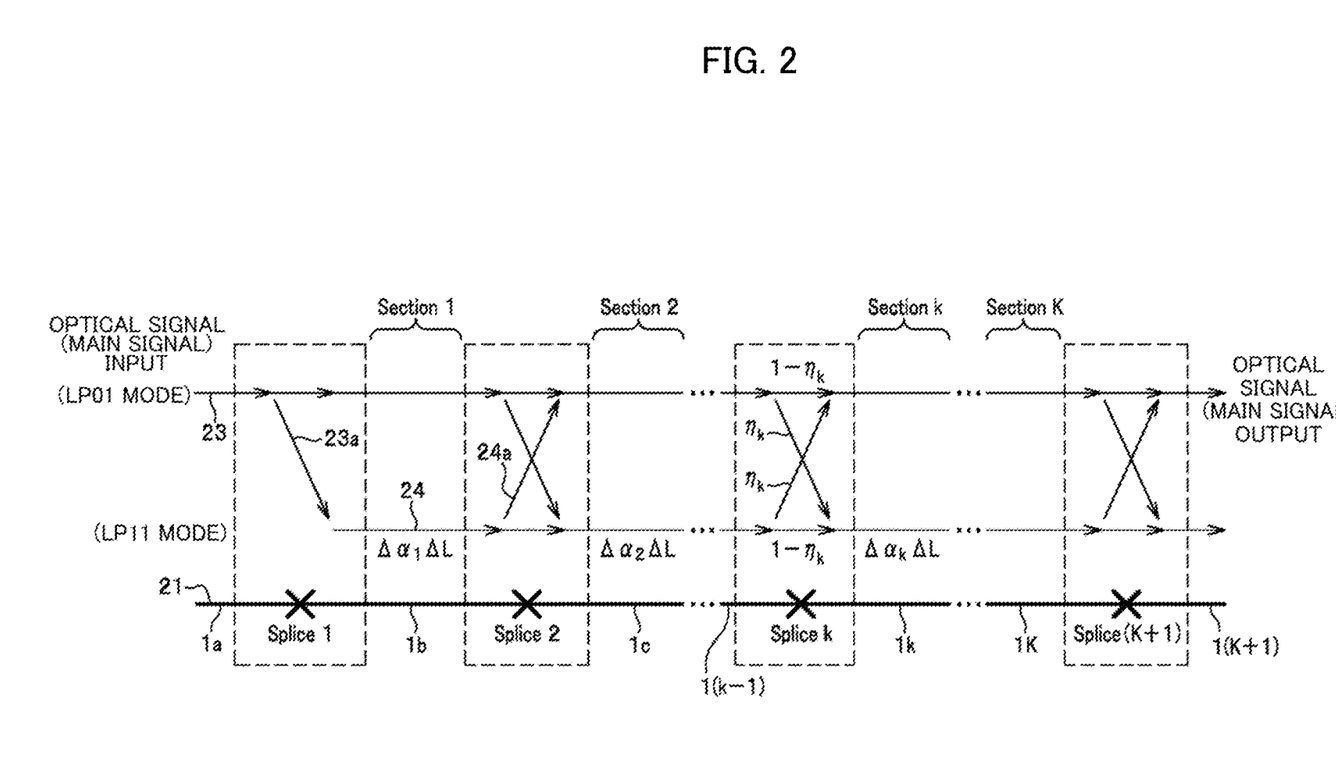
FIG. 2 is a diagram illustrating optical transmission lines, splices, sections, optical signals and optical power in an LP01 mode, and optical signals and optical power in an LP11 mode.

A multipath interference analysis device (also referred to as an interference analysis device) 10 illustrated in FIG. 1 analyzes multipath interference occurring in an optical transmission line 21 (FIG. 2). This interference analysis device 10 includes a splice loss acquisition unit 11, a cutoff wavelength acquisition unit 12, a statistic amount calculation unit 13, a truncated normal distribution determination unit 14, a random number generation unit 15, an MPI value calculation unit 16, and an MPI average value calculation unit 17. The splice loss acquisition unit 11 is connected to a splice loss measurement unit 11a. The cutoff wavelength acquisition unit 12 is connected to a cutoff wavelength measurement unit 12a.

The optical transmission line 21 illustrated in FIG. 2 is formed to have a predetermined length, in which adjacent ones of (K+1) optical fiber pieces having a predetermined length (also referred to as pieces) 1a, 1b, 1c, . . . , 1(k−1), 1k, . . . , 1(K+1) are welded (spliced), as indicated by a mark X.

The X-marked splice portion is further shown to be surrounded by a dashed frame. In this dashed frame, a dashed frame surrounding a splice portion X between a piece 1a and a piece 1b is referred to as a splice 1. A dashed frame surrounding a splice X between the piece 1b and a piece 1c is referred to as a splice 2, a dashed frame surrounding a splice X between a piece 1(k−1) and a piece 1k is referred to as a splice k, and a dashed frame surrounding a splice X between the piece 1K and a piece 1(K+1) is referred to as a splice (K+1).

A section 1 is between the splice 1 and the splice 2, a section 2 is between the splice 2 and a splice 3 (not illustrated), a section k is between the splice k and a splice k+1, and a section K is between the splice K (not illustrated) and the splice K+1. Further, an interval between splices (for example, the splices 1 and 2) before and after the optical transmission line 21 is called a splice interval ΔL.

In FIG. 2, series of continuous arrows extending in parallel in horizontal directions indicate an optical signal 23 in an LP01 mode (fundamental mode, also referred to as a fundamental optical signal 23) transmitted to the optical transmission line 21, and an optical signal 24 in the LP11 mode (high-order mode, also referred to as a high-order optical signal 24). The fundamental optical signal 23 is a main signal, input to the splice 1, and output from the splice (K+1) via the splices 1, 2, . . . , k, . . . . The high-order optical signal 24 is output from the splice (K+1) via the splices 1, 2, . . . , k, . . . .

An obliquely downward arrow 23a between the series of continuous arrows of the fundamental optical signal 23 and the high-order optical signal 24 indicates that a predetermined optical power 23a of the fundamental optical signal 23 is excited (input) to the high-order optical signal 24. A diagonally upward arrow 24a indicates that a predetermined optical power 24a of the high-order optical signal 24 is excited into the fundamental optical signal 23. The predetermined optical powers 23a and 24a that are excited as indicated by oblique arrows are hereinafter described simply as optical powers 23a and 24a.

For example, at the splice 1, the optical power 23a of the fundamental optical signal 23 is excited into the high-order optical signal 24, as indicated by an arrow 23a in a lower right direction. This excited optical power 23a is coupled (mode-coupled) to the high-order optical signal 24 in the LP11 mode. A splice loss, which is a transmission loss or a reflection loss, is received due to the mode coupling. This high-order optical signal 24 advances to the next splice 2, and the optical power 24a of the high-order optical signal 24 is excited into the fundamental optical signal 23, as indicated by an arrow 24a in an upward right direction. This excited optical power 24a is mode-coupled to the fundamental optical signal 23 in the LP01 mode.

It is assumed that a process of recoupling from the LP11 mode to the LP01 mode is performed only once, after the optical power 23a of the fundamental optical signal 23 in the LP01 mode is mode-coupled into the LP11 mode as described above. Here, it is assumed that the processes of the mode coupling and recoupling are not performed more than once on one splice. That is, it is assumed that the optical power 24a of the high-order optical signal 24 is superposed on the fundamental optical signal 23 in the LP01 mode as the multipath interference (MPI) in one process on one splice. This superposition is repeated with mode coupling at each of the splices 1 to (K+1), and multipath interference is accumulated.

Further, it is assumed that the splice spacing ΔL is larger than a coherence length of a light source that emits an optical signal, such that optical powers are incoherently superposed.

On the basis of these assumptions, an amount of multipath interference (MPI) (MPI value) received by the LP01 mode optical signal is obtained by using Equation (1) below.

[Math. 1]

$$MPI = \sum_{m=1}^{K-1} \sum_{l=1}^{K-m} \frac{\eta_l \eta_{m+l}}{(1-\eta_l)(1-\eta_{m+l})} e^{-\sum_{k=l}^{l+m-1} \Delta\alpha_k \Delta L} \quad (1)$$

In Equation (1), $\eta_k = 1 - 10^{-\varepsilon_k/10}$, and $\Delta\alpha_k = \alpha_{11,(k)} - \alpha_{01}$.

The above $\alpha_{11,(k)} = (19.34/\Delta L) X^{(\lambda_{sig} - \lambda_{c,(k)})/10}$ (2).

In Equation (2), $\lambda_{sig}$ indicates an input optical signal wavelength and $\lambda_{c,(k)}$ indicates a cutoff wavelength between splices indicated by X (see FIG. 2). $\lambda_{sig} - \lambda_{c,(k)}$ is a difference between the input optical signal wavelength and the cutoff wavelength. From this difference, a transmission loss of an optical signal (high-order optical signal 24) in the LP11 mode of $\alpha_{11,(k)}$ is derived.

Here, each symbol represents the followings:
k: splice number, for example k=1 indicates the splice 1.
$\Delta\alpha_{(k)}$: Differential mode loss (DML).
$\alpha_{11,(k)}$: Transmission loss in the LP11 mode.
$\alpha_{01}$: Transmission loss in the LP01 mode.
ΔL: Splice spacing.
$\eta_k$: Power coupling coefficient, an amount of optical power coupled to a partner mode.
$\varepsilon_k$: Splice loss.
$\lambda_{c(k)}$: Cutoff wavelength of an interval between splices indicated by x in FIG. 2.
l indicates a splice at which the optical power 23a transitions from the LP01 mode to the LP11 mode.
m indicates the number of splices crossed by the optical power 24a in the LP11 mode.

The MPI obtained by Equation (1) indicates an amount of multipath interference over the entire length from an optical signal input to an output of the optical transmission line 21 illustrated in FIG. 2. That is, the MPI obtained by Equation (1) indicates the amount of multipath interference on the output side of the splice (K+1) at the last stage, which interference is caused by the influence that the fundamental optical signal 23 in the LP01 mode receives from the optical power 24a excited by the optical signal 24 in the LP11 mode.

In Σ of a double sum in Equation (1), for example, when l=1, this indicates that the optical power 23a is excited from the LP01 mode to the LP11 mode at the splice 1 (see FIG. 2). In this case, when m=1, this indicates that the optical power 24a of the high-order optical signal 24 of the splice 1 is transmitted through a section 1 and excited back from the LP11 mode to the LP01 mode at the splice 2. When m=2, this indicates that the optical power 24a of the higher order optical signal 24 is transmitted through a section 2 and excited back from the LP11 mode to the LP01 mode at the splice 3.

In Equation (1), $(1-\eta_l)$ indicates a percentage at which the optical power does not return. This percentage of optical power goes to the next splice in a transmission direction. $(1-\eta_{m+l})$ indicates how many splices 1, . . . are transmitted by the optical power 23a excited from the LP01 mode to the LP11 mode at an l-th time. $\eta_l \eta_{m+l}/(1-\eta_l)(1-\eta_{m+l})$ indicates a coupling coefficient of the optical powers of all the splices.

In Equation (1), a part of a multiplication equation of e indicates an addition of all dB losses of optical power for each section from the input to the output of the fundamental optical signal 23.

Returning to FIG. 1, the splice loss measurement unit 11a is incorporated as a splice loss measurement function in a measurement device optically connected to each of the splices 1 to (K+1) of the optical transmission line 21, and measures the splice loss at each of the splices 1 to (K+1).

The cutoff wavelength measurement unit 12a is incorporated as a cutoff wavelength measurement function in a measurement device optically connected to each of the optical fiber pieces 1a to 1(K+1) in the optical transmission line 21, and measures a cutoff wavelength, which is a wavelength at a boundary between the fundamental mode and the multimode of each of the optical fiber pieces 1a to 1(K+1).

The splice loss acquisition unit 11 of the interference analysis device 10 acquires an actual measurement value (measurement value) of a splice loss in each of the measured splices 1 to (K+1). The cutoff wavelength acquisition unit 12 acquires the measured actual measurement values (measurement values) of the cutoff wavelengths of the pieces 1a to 1(K+1).

Figure 3:
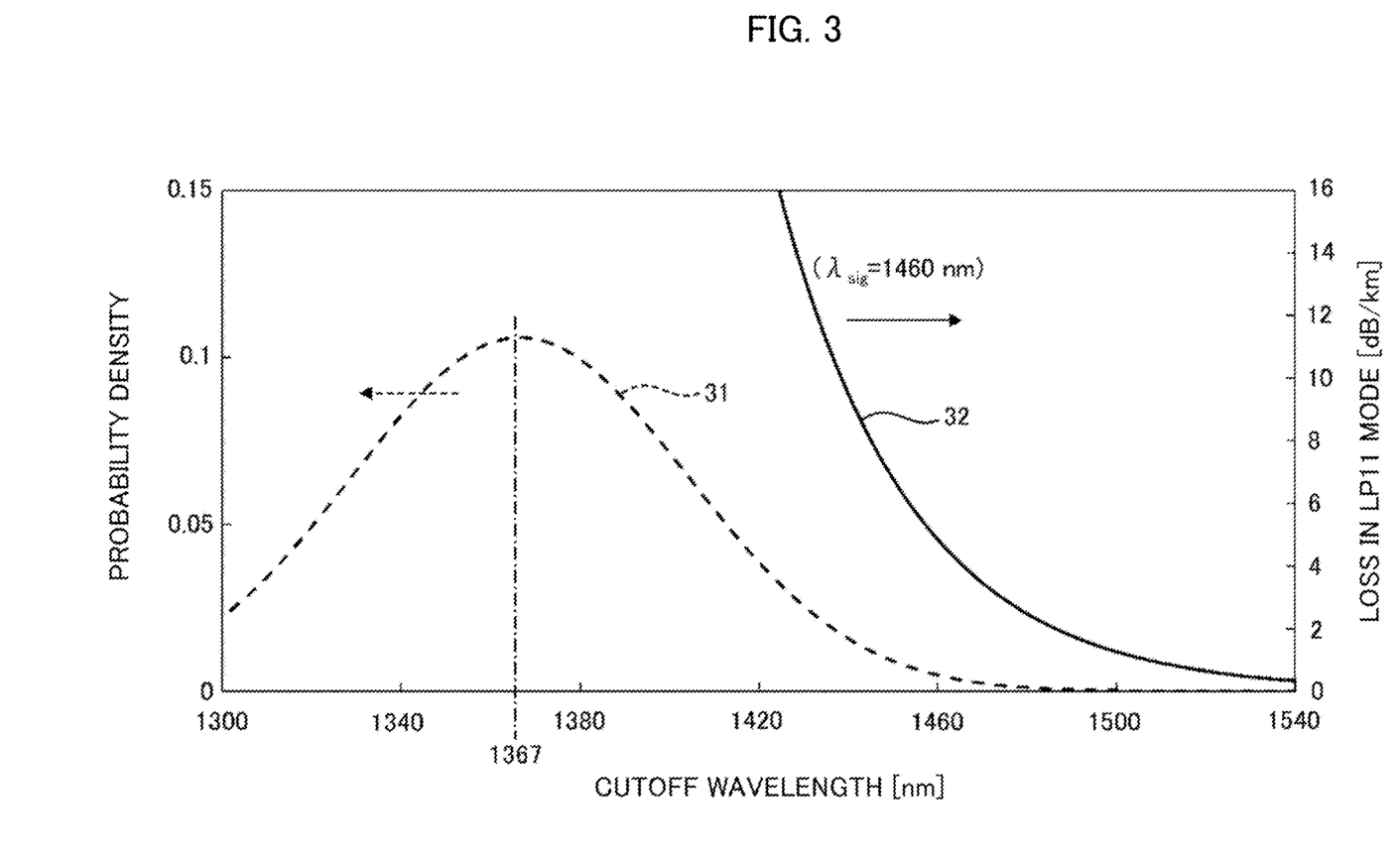
FIG. 3 is a diagram illustrating a normal distribution of a cutoff wavelength on a horizontal axis, a probability density on a left vertical axis, and a loss in an LP11 mode (mode dependent loss) related to a falling curve distribution on a right vertical axis.

The statistic amount calculation unit 13 calculates a statistical amount of average values and variance values of the acquired actual measurement values of the splice losses of the splices 1 to (K+1) and the actual measurement values of the cutoff wavelength of the pieces 1a to 1(K+1). By this calculation, the normal distribution of the cutoff wavelengths (also referred to as a cutoff wavelength 31) indicated by a dashed chevron curve 31 in FIG. 3 is obtained.

Figure 4:
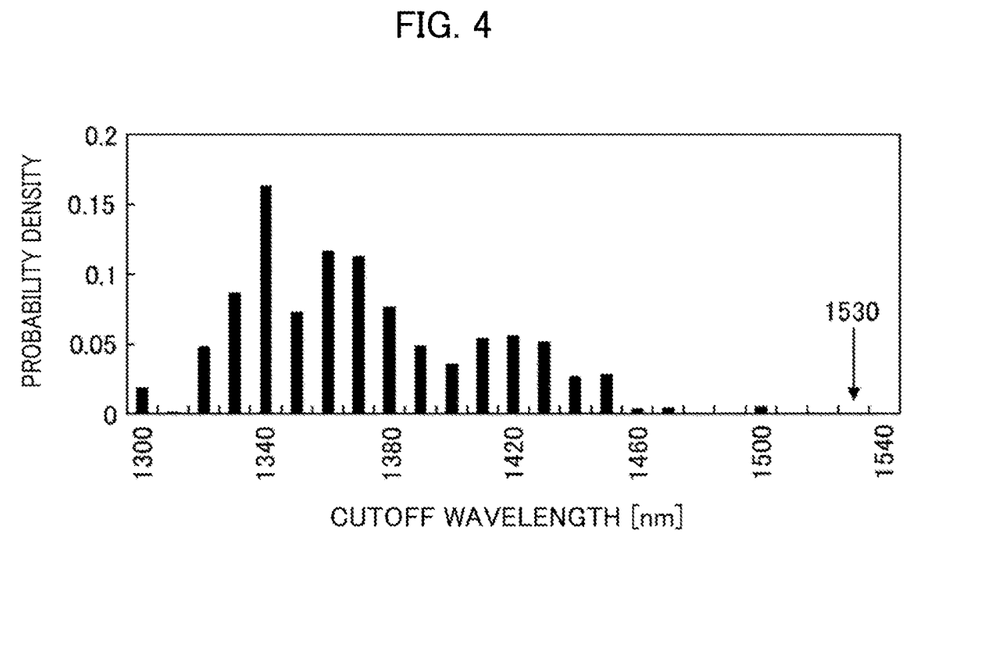
FIG. 4 is a diagram illustrating a frequency distribution of a cutoff wavelength.

The cutoff wavelengths are generally randomly distributed due to a variation in manufacturing of optical fiber pieces, but there is no deviation from a standard cutoff wavelength. Therefore, the actual measurement value of the cutoff wavelength of the G.654.E optical fiber described above is a frequency distribution of the cutoff wavelength illustrated in the bar graph in FIG. 4, and is represented by a normal distribution according to the dashed chevron curve 31 in FIG. 3.

The cutoff wavelength 31 indicated by this chevron curve is converted into a truncated normal distribution as follows by the truncated normal distribution determination unit (also referred to as determination unit) 14 illustrated in FIG. 1. Note that the cutoff wavelength 31 is a truncated normal distribution obtained by truncating a normal distribution at an upper limit and a lower limit under an assumption that there is nothing exceeding a specification value in the normal distribution, which is obtained by performing evaluation with a distribution equivalent to a normal distribution of a result that is obtained by evaluating an actual installed equipment and manufacturing variation.

Figure 5:
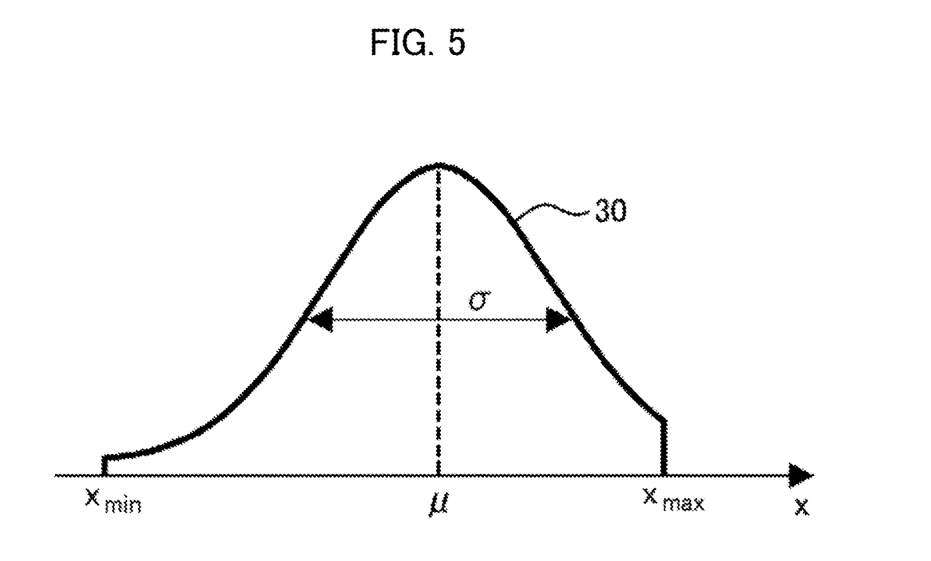
FIG. 5 is a diagram illustrating a truncated normal distribution.

That is, the determination unit 14 truncates the normal distribution of the cutoff wavelength 31 at predetermined lower and upper limit values of the cutoff wavelength to determine a truncated normal distribution. This truncated normal distribution is a graph in which both ends of the normal distribution indicated by the chevron curve 30 are respectively a minimum value (Xmin) corresponding to the lower limit value and a maximum value (Xmax) corresponding to the upper limit value, at which ends the distribution becomes 0, as illustrated in FIG. 5. $\mu$ indicates an average value and $\sigma$ indicates a variance value.

Thus, one reason of cutting the cutoff wavelength 31 at the upper and lower limits is because, when multipath interference (MPI) is analyzed and estimated using all of the cutoff wavelengths, the MPI is excessively estimated and this is worst value analysis for achieving the certainty of optical transmission, resulting in an excessively installed optical transmission line. Further, the other reason is because the average value of all cutoff wavelengths includes an outstanding value, and therefore an accurate estimation cannot be always obtained.

The cutoff wavelength 31 has a high occurrence probability around the average value of 1367 nm as illustrated in FIG. 3, and the occurrence probability decreases as the distance from the average value of 1367 nm increases. A wavelength on the shorter wavelength side (1300 nm side) than the average value of 1367 nm of the cutoff wavelength 31 is easily transmitted in the multimode. At wavelengths on the longer wavelength side (1460 nm side), it is extremely difficult fora the high-order mode (high-order optical signal 24) to exist.

That is, in the actual measurement values of the cutoff wavelength of the G.654.E optical fiber, the loss in the LP11 mode (mode dependent loss) indicated by the right vertical axis in FIG. 3 has a distribution of a falling curve 32. As shown by this falling curve 32, when the wavelength is longer than 1500 nm, there is substantially no cutoff wavelength, and the loss in the LP11 mode is reduced.

Further, when a wavelength of the input optical signal 23 (FIG. 2) to the optical transmission line 21 is 1460 nm, it is easy for the cutoff wavelength 31 to exist on the shorter wavelength side than 1460 nm, and thus, a loss in the LP11 mode shown on a right vertical axis (mode dependent loss) becomes smaller. Because the LP11 mode cannot exist on the short wavelength side, a mode-dependent loss in the high-order mode (the high-order optical signal 24 illustrated in FIG. 2) increases. Even when the high-order optical signal 24 is generated, it disappears immediately.

Returning to FIG. 1, the random number generation unit 15 generates random numbers for selecting a predetermined number (for example, 10) of optical fiber pieces of a splice connection target on the basis of the truncated normal distribution determined by the determination unit 14 using a random sampling method.

That is, the determination unit 14 determines the truncated normal distribution related to the cutoff wavelength 31 on the basis of statistical variations of the cutoff wavelengths 31 of the respective pieces 1*a* to 1(K+1) (see FIG. 2) and the splice losses of the respective splices 1 to (K+1) calculated by the statistic amount calculation unit 13. The random number generation unit 15 generates random numbers for selecting the pieces 1*a* to 1(K+1) on the basis of the truncated normal distribution.

The MPI value calculation unit 16 substitutes a loss coefficient (mode dependent loss coefficient) $\alpha_{01}$ in the LP01 mode and the splice interval $\Delta L$ into Equation (1) described above to calculate the MPI value in the optical transmission line 21 (FIG. 2) constructed by a predetermined number of pieces 1*a* to 1(K+1) selected according to the random numbers. This calculation is repeated for a prescribed number of trials.

The MPI average value calculation unit 17 calculates the average value of the MPI values for a prescribed number of trials. This calculation results in a multipath interference value of the optical transmission line 21.

Here, the MPI value calculation unit 16 is assumed to calculate a cumulative MPI value in the optical transmission line 21 of 100 km constructed by the pieces 1*a* to 1(K+1) with the splice interval $\Delta L$ of 4 km through Monte Carlo simulation performed by the MPI average value calculation unit 17. The Monte Carlo simulation is a calculation technique for obtaining an approximate solution, for example, for an index for which it is difficult to set a predicted value, by repeating simulations sufficiently many times using random numbers.

As an index of the MPI value in a statistical analysis, $\mu_{MPI}+3\sigma_{MPI}$ an at 1000 trials is assumed to be used. $\mu_{MPI}$, is an average value, and $3\sigma_{MPI}$ is a variance value indicating how much variation there is from the average value.

While the worst-value analysis as the conventional art overestimates the MPI value for the practical optical transmission line 21 having a statistical variation, the above described statistical analysis is able to appropriately evaluate the MPI value as follows.

Here, as common conditions at the calculation of the MPI value performed by the MPI value calculation unit 16, it is assumed that a wavelength $\lambda$sig of the optical signal 23 input to the optical transmission line 21 is 1460 nm, and that a loss coefficient in the LP01 mode is 0.17 dB/km. Further, an allowable range in which the cutoff wavelength [nm] can take (a range between a minimum value and a maximum value of the cutoff normal distribution) is assumed to be from 1300 nm (minimum value) to 1530 nm (maximum value) indicated on a horizontal axis in FIG. 6. An allowable range in which the splice loss [dB] can take is assumed to be from 0.00 to 0.10 dB (an assumed worst value) indicated on a horizontal axis in FIG. 7.

Figure 6:
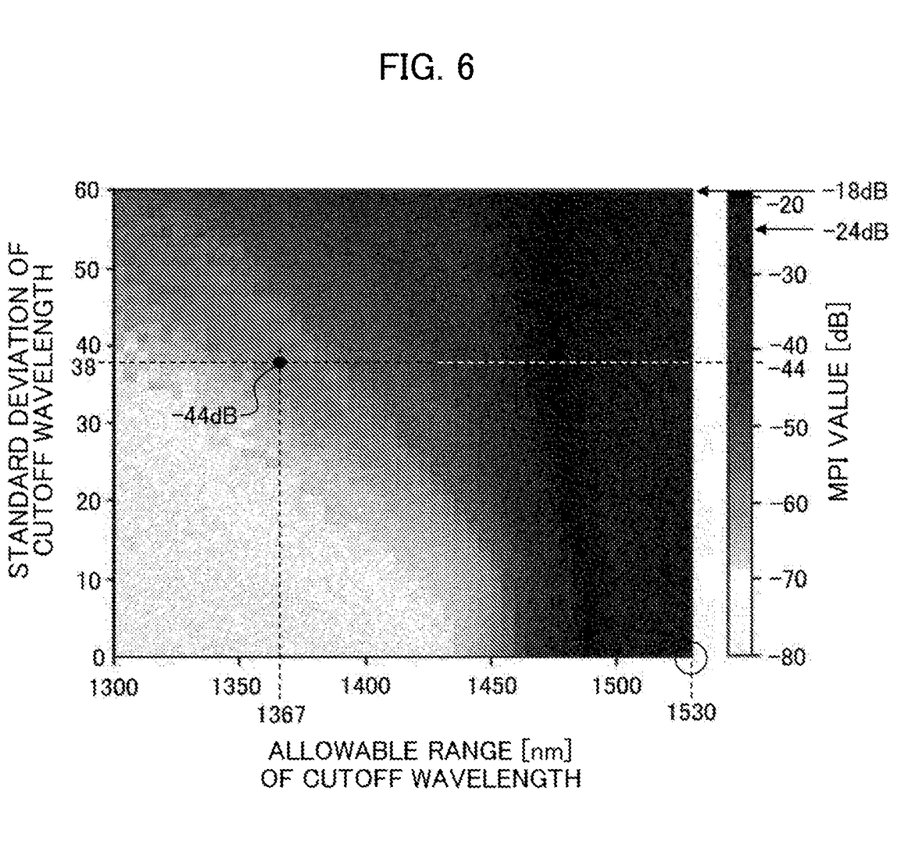
FIG. 6 is a graph illustrating an allowable range in which a cutoff wavelength can take on a horizontal axis, a standard deviation of the cutoff wavelength on a left vertical axis, and an MPI value on a right vertical axis.

The MPI value is assumed to be calculated on the basis of these common conditions. As a result, as illustrated in FIG. 6, an average value of a cutoff wavelength distribution is 1367 nm (horizontal axis), and a standard deviation (variation) on a left vertical axis was 38. In this case, the MPI value of the statistical analysis value obtained by considering the distribution of the actual measurement values of the cutoff wavelength is −44 dB.

As the cutoff wavelength on the horizontal axis illustrated in FIG. 6 is larger (closer to 1530 nm), susceptibility to the multipath interference (MPI) is larger, and the MPI value (MPI amount) on the right vertical axis becomes larger toward −20 [dB]. When the cutoff wavelength is 1530 nm, the MPI value is −18 dB of the worst value. In other words, the MPI value becomes smaller as its absolute value increases, and the susceptibility to multipath interference decreases, and thus, the transmission performance of the fundamental optical signal 23, which is the main signal, is improved.

At −18 dB, the fundamental optical signal 23 is not able to be transmitted through the optical transmission line 21 because it is susceptible to multipath interference. The fundamental optical signal 23 is not able to be transmitted unless the MPI value is smaller than a threshold value of −24 dB. The threshold value of −24 dB is a well-known XT (interference) threshold value at which it is defined that the multipath interference affects an optical signal transmitted by Quadrature Amplitude Modulation (16-QAM). When a modulation scheme is changed to anything other than 16-QAM, the threshold value varies up or down from −24 dB.

When the cutoff wavelength is an optical signal wavelength in the LP01 mode=1460 nm, there is no influence of the multipath interference. In this example, the fundamental optical signal 23 is able to be transmitted because the MPI value of the statistical analysis value obtained by considering the distribution of the actual measurement values of the cutoff wavelength is −44 dB.

Figure 7:
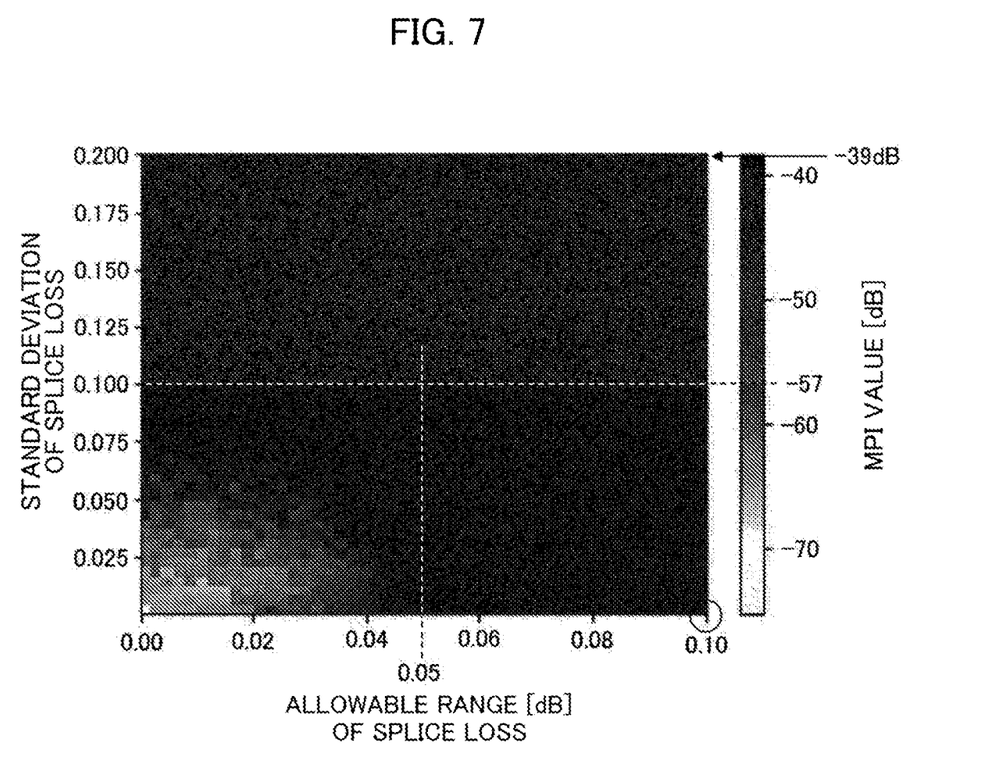
FIG. 7 is a diagram illustrating an allowable range in which a splice loss can take on a horizontal axis, a standard deviation of the splice loss on a left vertical axis, and an MPI value on a right vertical axis.

As the splice loss on the horizontal axis illustrated in FIG. 7 is larger (closer to 0.10), susceptibility to the multipath interference is larger, and the MPI value on the right vertical axis becomes larger toward the −40 dB. When the splice loss is 0.10 dB, the MPI value is −39 dB of the worst value.

Further, when the splice loss is 0.05 dB of the average value, a standard deviation (variation) on the left vertical axis is 0.100. In this case, because the MPI value of the statistical analysis value obtained by considering the distribution of actual measurement values of the splice loss is −57 dB, the fundamental optical signal 23 is able to be transmitted.

As described above, when the MPI value obtained by considering the distribution of the actual measurement values of the cutoff wavelength is −44 dB and the MPI value obtained by considering the distribution of the actual measurement values of the price loss is −57 dB, influence of the cutoff wavelength and the splice loss can be ignored. Therefore, the fundamental optical signal 23 is appropriately transmitted in the 100 km optical transmission line 21 constructed by the pieces $1a$ to $1(K+1)$ each having the splice interval $\Delta L$ of 4 km.

<Hardware Configuration>

Figure 8:
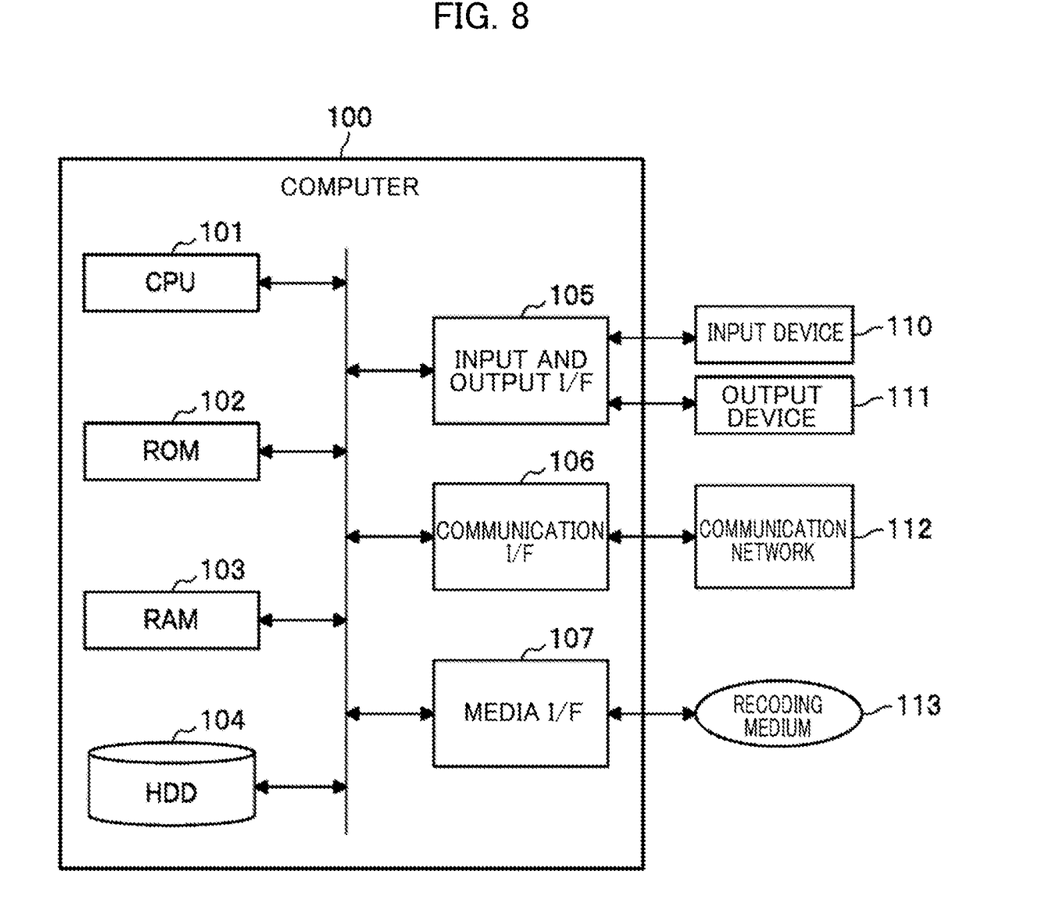
FIG. 8 is a block diagram of a computer that constitutes the multipath interference analysis device.

The multipath interference analysis device 10 according to the embodiment described above is implemented by a computer 100 configured as illustrated in FIG. 8, for example. The computer 100 includes a central processing unit (CPU) 101, a read only memory (ROM) 102, a random access memory (RAM) 103, a hard disk drive (HDD) 104, an input and output interface (I/F) 105, a communication I/F 106, and a media I/F 107.

The CPU 101 operates according to a program stored in the ROM 102 or the HDD 104 and performs control of each functional unit. The ROM 102 stores a boot program that is executed by the CPU 101 when the computer 100 is started, a program related to hardware of the computer 100, and the like.

The CPU 101 controls the output device 111 such as a printer or a display and the input device 110 such as a mouse or a keyboard through the input and output I/F 105. The CPU 101 acquires data from the input device 110 or outputs generated data to the output device 111 via the input and output I/F 105.

The HDD 104 stores a program that is executed by the CPU 101, data that is used by the program, and the like. The communication I/F 106 receives data from other devices (not illustrated) via a communication network 112, outputs the data to the CPU 101, and transmits data generated by the CPU 101 to other devices via the communication network 112.

The media I/F 107 reads a program or data stored in the recording medium 113 to output the program or data to the CPU 101 via the RAM 103. The CPU 101 loads a program related to a target processing from the recording medium 113 onto the RAM 103 via the media I/F 107, and executes the loaded program. The recording medium 113 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, when the computer 100 functions as the multipath interference analysis device 10 according to the embodiment, the CPU 101 of the computer 100 implements the functions of the multipath interference analysis device 10 by executing a program loaded on the RAM 103. Further, the data in the RAM 103 is stored in the HDD 104. The CPU 101 reads a program related to a target processing from the recording medium 113 and executes the program. In addition, the CPU 101 may read the program related to the target processing from another device via the communication network 112.

<Operation of Embodiment>

Next, an operation of the multipath interference analysis by the multipath interference analysis device 10 according to the present embodiment is described with reference to a flowchart of FIG. 9.

Figure 9:
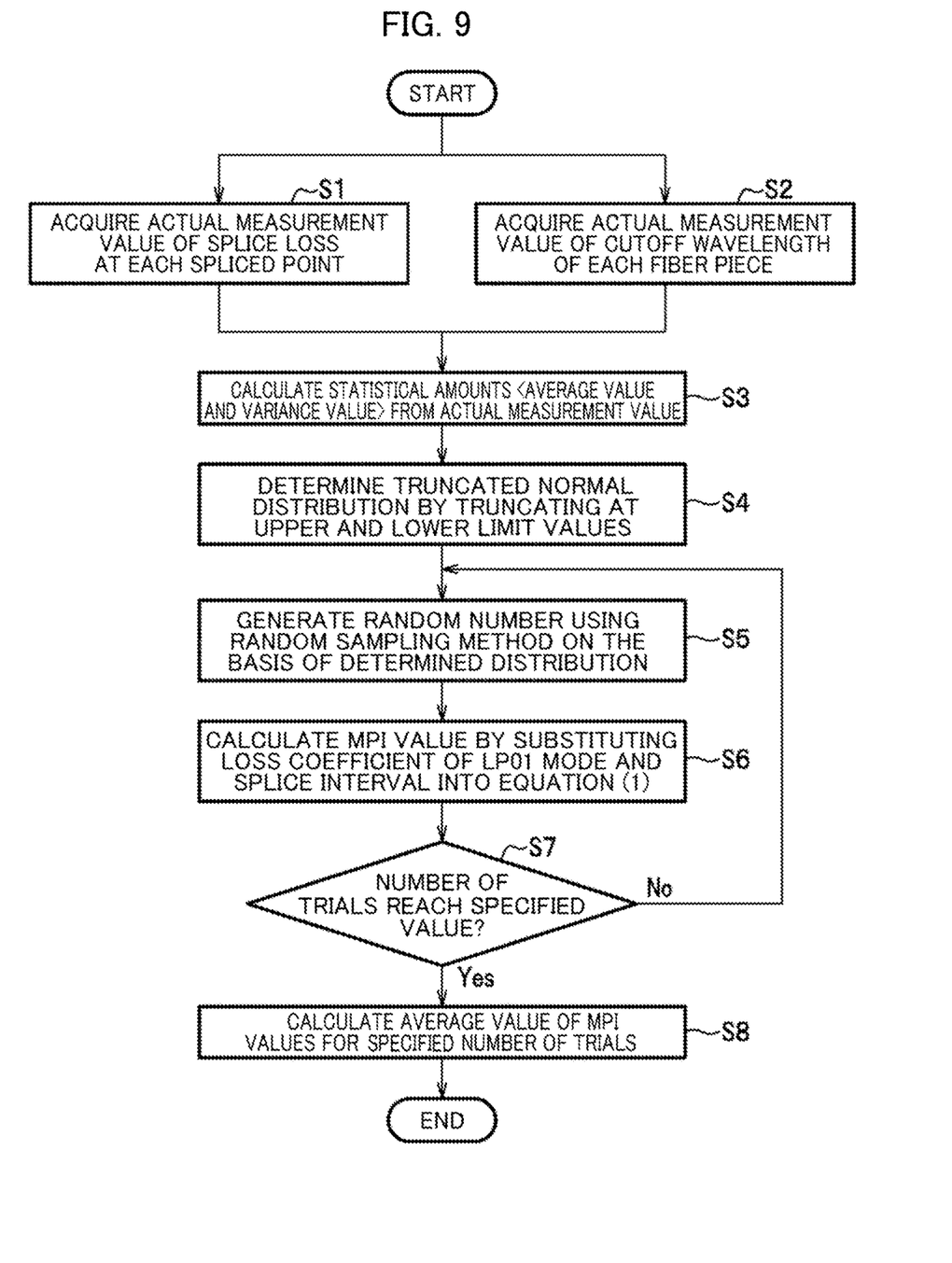
FIG. 9 is a flowchart of multipath interference analysis processing in the multipath interference analysis device of the present embodiment.

In step S1 illustrated in FIG. 9, the splice loss acquisition unit 11 of the multipath interference analysis device 10 acquires the actual measurement value of the splice loss at each of the splices 1 to (K+1) measured by the splice loss measurement unit $11a$.

In step S2, the cutoff wavelength acquisition unit 12 acquires the actual measurement value of the cutoff wavelength of each of the pieces $1a$ to $1(K+1)$ measured by the cutoff wavelength measurement unit $12a$.

In step S3, the statistic amount calculation unit 13 calculates the statistical amount of average values and variance values of the acquired actual measurement values of the splice losses of the splices 1 to (K+1) and the actual measurement values of the cutoff wavelength of the pieces $1a$ to $1(K+1)$. This calculation yields the normal distribution of the cutoff wavelengths indicated by the dashed chevron curve 31 in FIG. 3.

In step S4, the truncated normal distribution determination unit 14 truncates the normal distribution of the cutoff wavelength 31 at predetermined lower and upper limit values of the cutoff wavelength to determine a truncated normal distribution.

In step S5, the random number generation unit 15 generates random numbers for selecting a predetermined number of optical fiber pieces $1a$ to $1(K+1)$ of the splice connection target on the basis of the truncated normal distribution determined by the determination unit 14, using the random sampling method.

In step S6, the MPI value calculation unit 16 substitutes the LP01 mode loss coefficient (mode dependent loss coefficient) $\alpha_{01}$ and the splice interval $\Delta L$ into Equation (1) described above to calculate the MPI value in the optical transmission line 21 constructed by the predetermined number of pieces $1a$ to $1(K+1)$ selected according to the random numbers. This calculation is repeated for the prescribed number of trials.

In step S7, the MPI value calculation unit 16 determines whether or not the number of trials of MPI value calculation reaches a specified value. When the MPI value calculation unit 16 determines that the number of trials of MPI value calculation does not reach the specified value (No), the processing returns to step S5 and continues.

On the other hand, when the MPI value calculation unit 16 determines that the number of trials of MPI value calculation reaches the specified value (Yes), the MPI average value calculation unit 17 calculates the average value of the MPI values for the specified number of trials in step S8. This calculation provides the MPI value of the optical transmission line 21.

<Effect of Embodiment>

Effects of the multipath interference analysis device 10 according to the embodiment of the present invention are described.

(1a) The multipath interference analysis device 10 includes the statistic amount calculation unit 13, the determination unit 14, the random number generation unit 15, and the MPI value calculation unit 16.

The statistic amount calculation unit 13 obtains a normal distribution of a cutoff wavelength through calculation of statistical amounts of average values and variance values of respective measurement values of splice loss measured from a plurality of optical fiber pieces 1a to 1(K+1) each having a predetermined length for forming an optical transmission line 21, and measurement values of the cutoff wavelength measured from the optical fiber pieces 1a to 1(K+1).

The determination unit 14 truncates the normal distribution of the cutoff wavelengths at the predetermined lower and upper limit values of the cutoff wavelength to determine the truncated normal distribution.

The random number generation unit 15 generates random numbers for selecting the predetermined number of pieces 1a to 1(K+1) of the splice connection target that forms the optical transmission line 21 on the basis of the determined truncated normal distribution.

The MPI value calculation unit 16 is configured to calculate an MPI value, which is the value of the multipath interference due to the cutoff wavelength and the splice loss using the mode dependent loss of the fundamental mode and the splice interval of the optical transmission line 21 formed by the predetermined number of pieces 1a to 1(K+1) selected according to the random numbers in the optical transmission line 21.

With this configuration, the MPI value caused by the cutoff wavelength and the splice loss calculated by the MPI value calculation unit 16 is smaller than the MPI value obtained by the worst value analysis when the cutoff wavelength is long and the splice loss is large, and becomes a value at which an influence of the cutoff wavelength and the splice loss can be ignored. Therefore, the optical signal 23 in the fundamental mode can be appropriately transmitted in the optical transmission line 21 formed by the predetermined number of optical fiber pieces 1a to 1(K+1).

As described above, according to the multipath interference analysis of the present embodiment, because the MPI value can be estimated to be smaller than the MPI value obtained by the worst value analysis, the wasteful costs incurred in the optical transmission line equipment constructed under the estimation conditions can be suppressed.

(2a) The MPI value calculation unit 16 is configured to substitute the fundamental mode loss coefficient: $\alpha_{01}$ and the splice interval: $\Delta L$ into the following equation to calculate the MPI value.

$$MPI = \sum_{m=1}^{K-1} \sum_{l=1}^{K-m} \frac{\eta_l \eta_{m+l}}{(1-\eta_l)(1-\eta_{m+l})} e^{-\sum_{k=l}^{l+m-1} \Delta \alpha_k \Delta L} \quad \text{[Math. 2]}$$

l: Splice at which optical power transitions from fundamental mode to high-order mode m: Number of splices crossed by optical power in high-order mode k: Splice number $\Delta \alpha_{(k)} = \alpha_{11} - \alpha_{01}$: Mode dependent loss $\alpha_{11,(k)} = (19.34/\Delta L) X^{(\lambda_{sig} - \lambda_{c,(k)})/10}$: Transmission loss in high-order mode $\eta_k = 1 - 10^{-\varepsilon k/10}$: Power coupling coefficient $\varepsilon_k$: Splice loss $\eta_1 \eta_{m \to 1}/(1-\eta_1)(1-\eta_{m+1})$: Coupling coefficient of optical power of all splices $\lambda_{c,(k)}$: Cutoff wavelength between splices $\lambda_{sig} - \lambda_{c,(k)}$: Difference between input optical signal wavelength to optical transmission path and cutoff wavelength With this configuration, because the MPI value can be estimated to be smaller than the MPI value obtained by the worst value analysis, it is possible to suppress the wasteful costs incurred in the optical transmission line equipment constructed under the estimation conditions.

(3a) The MPI value calculation unit 16 repeats the calculation of the MPI value a predetermined number of times. The multipath interference analysis device 10 is configured to include the MPI average value calculation unit 17 calculating an average value of the MPI values calculated by repeating the calculation the predetermined number of times.

With this configuration, it is possible to more accurately obtain the MPI value of the optical transmission line.

<Effect>

(1) A multipath interference analysis device includes a statistical amount calculation unit configured to obtain a normal distribution of a cutoff wavelength through calculation of statistical amounts of average values and variance values of respective measurement values of splice loss measured from a plurality of optical fiber pieces each having a predetermined length for forming an optical transmission line and measurement values of the cutoff wavelength measured from the optical fiber pieces; a determination unit configured to truncate the normal distribution of the cutoff wavelength at predetermined lower and upper limit values of the cutoff wavelength to determine a truncated normal distribution; a random number generation unit configured to generate random numbers for selecting a predetermined number of optical fiber pieces to be connected by a splice connection for forming the optical transmission line, on the basis of the determined truncated normal distribution; and an MPI value calculation unit configured to calculate an MPI value, the MPI value being a value of multipath interference caused by the cutoff wavelength and the splice loss using a mode dependent loss in a fundamental mode and a splice interval in the optical transmission line formed by the predetermined number of optical fiber pieces selected according to the random numbers.

With this configuration, the MPI value caused by the cutoff wavelength and the splice loss calculated by the MPI value calculation unit is smaller than the MPI value obtained by the worst value analysis when the cutoff wavelength is long and the splice loss is large, and is a value in which an influence of the cutoff wavelength and the splice loss can be ignored. Therefore, the optical signal in the fundamental mode can be appropriately transmitted in the optical transmission line formed by the predetermined number of optical fiber pieces.

Thus, according to the multipath interference analysis of the present invention, because the MPI value can be estimated to be smaller than the MPI value obtained by the worst value analysis, the wasteful costs incurred in the optical transmission line equipment constructed under the estimation conditions can be suppressed.

The multipath interference analysis device according to claim 1, wherein the MPI value calculation unit substitutes the fundamental mode loss coefficient: $\alpha_{01}$ and the splice interval: $\Delta L$ into the following equation to calculate the MPI value.

$$MPI = \sum_{m=1}^{K-1}\sum_{l=1}^{K-m} \frac{\eta_l \eta_{m+l}}{(1-\eta_l)(1-\eta_{m+l})} e^{-\sum_{k=l}^{l+m-1}\Delta\alpha_k \Delta L} \quad [\text{Math. 3}]$$

l: Splice at which optical power transitions from fundamental mode to high-order mode
m: Number of splices crossed by optical power in high-order mode
k: Splice number
$\Delta\alpha_{(k)}=\alpha_{11}-\alpha_{01}$: Mode dependent loss
$\alpha_{11,(k)}=(19.34/\Delta L)X^{(\lambda sig-\lambda c,(k))/10}$: Transmission loss in high-order mode
$\eta_k=1-10^{-\varepsilon k/10}$: Power coupling coefficient
$\varepsilon_k$: Splice loss
$\eta_1\eta_{m+1}/(1-\eta_1)(1-\eta_{m+1})$: Coupling coefficient of optical power of all splices
$\lambda_{c,(k)}$: Cutoff wavelength between splices
$\lambda_{sig}-\lambda_{c,(k)}$: Difference between input optical signal wavelength to optical transmission path and cutoff wavelength With this configuration, because the MPI value can be estimated to be smaller than the MPI value obtained by the worst value analysis, it is possible to suppress the wasteful costs generated in the optical transmission line equipment constructed under the estimation conditions.

The multipath interference analysis device, wherein the MPI value calculation unit includes an MPI average value calculation unit configured to repeat the calculation of the MPI value a predetermined number of times and calculate an average value of the MPI values calculated by repeating the calculation the predetermined number of times.

With this configuration, it is possible to more accurately obtain the MPI value of the optical transmission line.

In addition, a specific configuration can be appropriately modified without departing from the gist of the present invention.

REFERENCE SIGNS LIST

10: Multipath interference analysis device
11: Splice loss acquisition unit
11a: Splice loss measurement unit
12: Cutoff wavelength acquisition unit
12a: Cutoff wavelength measurement unit
13: Statistic amount calculation unit
14: Truncated normal distribution determination unit (determination unit)
15: Random number generation unit
16: MPI value calculation unit
17: MPI average value calculation unit
21: Optical transmission line
23: Optical signal in fundamental mode
23a: Predetermined optical power of optical signal in fundamental mode
24: Optical signal in high-order mode
24a: Predetermined optical power of optical signal in high-order mode
1a to 1K, 1(K+1): Optical fiber piece
1 to (K+1): Splice

The invention claimed is:

1. A multipath interference analysis device comprising:
a statistical amount calculation unit, comprising one or more processors, configured to obtain a normal distribution of a cutoff wavelength through calculation of statistical amounts of average values and variance values of respective measurement values of splice loss and the cutoff wavelength measured from a plurality of optical fiber pieces each having a predetermined length for forming an optical transmission line;
a determination unit, comprising the one or more processors, configured to truncate the normal distribution of the cutoff wavelength at predetermined lower and upper limit values of the cutoff wavelength to determine a truncated normal distribution;
a random number generation unit, comprising the one or more processors, configured to generate random numbers for selecting a predetermined number of optical fiber pieces of splice connection targets forming the optical transmission line, on a basis of the determined truncated normal distribution; and
a multipath interference (MPI) value calculation unit, comprising the one or more processors, configured to calculate an MPI value in the optical transmission line formed of the predetermined number of optical fiber pieces selected according to the random numbers using a mode dependent loss in a fundamental mode and a splice interval of the optical transmission line, the MPI value being a value of multipath interference caused by the cutoff wavelength and the splice loss.

2. The multipath interference analysis device according to claim 1, wherein the MPI value calculation unit is configured to substitute a fundamental mode loss coefficient: $\alpha_{01}$ and the splice interval: $\Delta L$ into an equation, $$MPI = \sum_{m=1}^{K-1}\sum_{l=1}^{K-m} \frac{\eta_l \eta_{m+l}}{(1-\eta_l)(1-\eta_{m+l})} e^{-\sum_{k=l}^{l+m-1}\Delta\alpha_k \Delta L}$$

l: Splice at which optical power transitions from fundamental mode to high-order mode
m: Number of splices crossed by optical power in high-order mode
k: Splice number
$\Delta\alpha_{(k)}=\alpha_{11}-\alpha_{01}$: Mode dependent loss
$\alpha_{11,(k)}=(19.34/\Delta L)X^{(\lambda sig-\lambda c,(k))/10}$: Transmission loss in high-order mode
$\eta_k=1-10^{-\varepsilon k/10}$: Power coupling coefficient
$\varepsilon_k$: Splice loss
$\eta_1\eta_{m\to1}/(1-\eta_1)(1-\eta_{m+1})$: Coupling coefficient of optical power of all splices
$\lambda_{c,(k)}$: Cutoff wavelength between splices
$\lambda_{sig}-\lambda_{c,(k)}$: Difference between input optical signal wavelength to optical transmission path and cutoff wavelength, to calculate the MPI value.

3. The multipath interference analysis device according to claim 2, wherein the MPI value calculation unit includes an MPI average value calculation unit configured to repeat calculation of the MPI value a predetermined number of times and to calculate an average value of the MPI values calculated by repeating the calculation the predetermined number of times.

4. The multipath interference analysis device according to claim 1, wherein the MPI value calculation unit includes an MPI average value calculation unit, configured to repeat calculation of the MPI value a predetermined number of times and to calculate an average value of the MPI values calculated by repeating the calculation the predetermined number of times.

5. A multipath interference analysis method using a multipath interference analysis device, obtaining a normal distribution of a cutoff wavelength through calculation of statistical amounts of average values and variance values of respective measurement values of splice loss measured from a plurality of optical fiber pieces each having a predetermined length for forming an optical transmission line and measurement values of the cutoff wavelength measured from the optical fiber pieces;

truncating the normal distribution of the cutoff wavelength at predetermined lower and upper limit values of the cutoff wavelength to determine a truncated normal distribution;

generating random numbers for selecting a predetermined number of optical fiber pieces of splice connection targets forming the optical transmission line, on a basis of the determined truncated normal distribution; and calculating a multipath interference (MPI) value in the optical transmission line formed of the predetermined number of optical fiber pieces selected according to the random number, the MPI value being a value of multipath interference caused by the cutoff wavelength and the splice loss, using a mode dependent loss in a fundamental mode and a splice interval of the optical transmission line.

* * * * *